United States Patent [19]

Suzuki et al.

[11] Patent Number: 4,977,615
[45] Date of Patent: Dec. 11, 1990

[54] DIVERSITY RECEIVER

[75] Inventors: Hirohisa Suzuki, Gunma; Akira Kabashima, Ota; Mikio Yamagishi, Gunma; Ryuichi Ogawa, Gunma, all of Japan

[73] Assignee: Sanyo Electric Co., Ltd., Osaka, Japan

[21] Appl. No.: 352,775

[22] Filed: May 16, 1989

[30] Foreign Application Priority Data

May 19, 1988 [JP] Japan ................. 63-122317

[51] Int. Cl.⁵ .......................... H04B 7/08; H04B 1/10
[52] U.S. Cl. ................... 455/277; 455/278; 455/297
[58] Field of Search ............ 455/277, 278, 297, 272, 455/345, 133, 134, 140, 63; 381/13; 375/100; 343/711

[56] References Cited

U.S. PATENT DOCUMENTS 4,499,606 2/1985 Rambo ................... 455/278
4,525,869 6/1985 Hamada et al. ........... 455/278

FOREIGN PATENT DOCUMENTS 62-294340 12/1987 Japan .

Primary Examiner—Reinhard J. Eisenzopf
Assistant Examiner—Curtis Kuntz
Attorney, Agent, or Firm—Darby & Darby

[57] ABSTRACT

A diversity receiver includes first and second antennae for receiving an RF signal, and an antenna switching circuit for selecting one of the first and second antennae. A first detection circuit having a high sensitivity, and a second detection circuit having a low sensitivity are provided, each detecting a noise signal contained within the received RF signal in different sensitivity. A field strength detection circuit is provided for detecting a field strength of the received RF signal, and a selection circuit is provided for selecting either one of the first and second detection circuits according to the output signal of the field strength detection circuit, and for providing a switching signal to the antenna switching circuit. Thus, when the field strength is relatively strong, the first detection circuit with high sensitivity is used for the noise detection, and when the field strength is relatively weak, the second detection circuit with low sensitivity is used for the noise detection.

9 Claims, 5 Drawing Sheets

DIVERSITY RECEIVER

BACKGROUND OF THE INVENTION

1. Field of the Invention

The present invention relates to a diversity receiver of a type which is provided with two antennas positioned with a certain space in between or two antennas having different characteristics, and which selects one antenna by a switching operation for connecting the selected antenna with the receiver, and more particularly, to a diversity receiver which is suitable for use in an FM radio receiver equipped in a motor vehicle.

2. Description of the Prior Art

A prior art diversity receiver is disclosed, for example, in Japanese Patent Laid-Open Publication No. 62-294340, in which one of the two antennae is selected in accordance with the noise level in the signal, and the selected antenna is connected to the receiver. As shown in FIG. 1, the prior art diversity receiver includes first and second antennae 1 and 2 and antenna switching circuit 3 for selecting one of the first and second antennae 1 and 2. Front end 4, IF amplifier 5, and FM detector 6 are provided for converting the FM radio signal received at the antenna to an IF (intermediate frequency) signal, amplifying, and FM detecting the IF signal, respectively. Stereo multiplexer 7 is provided for separating right and left channel stereo signals from the output signal of FM detector 6. A combination of high-pass filter 8 and noise wave detector 9 define a noise detection circuit 10 which detects the high frequency noise signal in the output signal of FM detector 6. A trigger circuit 11 is provided for producing a trigger pulse when the output signal from noise detection circuit 10 is greater than a predetermined level, and T-FF (trigger flip-flop) 12 is provided for producing a switching signal according to the trigger pulse.

A diversity receiver of this type switches the antenna when high frequency noise signal as detected by the FM detector 6 becomes greater than the predetermined level, and thereby maintaining good FM signal reception. In addition, a diversity receiver of the type shown in FIG. 1 further includes a counter 13 which counts the trigger pulses generated by trigger circuit 11, and a monostable multivibrator 14 which controls the operation of counter 13. By a control signal generated from counter 13 in accordance with the generation frequency of the trigger pulse, the stereo separation of the stereo multiplexer 7 is controlled to reduce the noise level.

Therefore, if the circuit as shown in FIG. 1 is used, good reception with no noise signal can be obtained.

However, in a diversity receiver as shown in FIG. 1, if the detection sensitivity of the noise signal is increased, erroneous operation caused by white noise during reception of weak field signals may easily occur. Furthermore, if detection sensitivity of the noise signal is lowered to prevent such an erroneous operation, the sensitivity will be insufficient for signals of a middle or strong field strength, and accurate detection of the noise signal will not be possible.

SUMMARY OF THE INVENTION

The present invention has been developed with a view to substantially solving the above described disadvantages and has for its essential object to provide an improved diversity receiver which can provide an accurate noise detection both under strong and weak field strength.

In accomplishing these and other objects, a diversity receiver according to the present invention comprises first and second noise detection circuits for detecting the noise signal included in the received signal, a field strength detection circuit for detecting the field strength of the received signal, and a selection circuit for selecting and outputting the output signal of the first or second noise detection circuit according to the output signal of the field strength detection circuit.

In a diversity receiver according to the present invention, the detection sensitivity of the first noise detection circuit is set high and the detection sensitivity of the second noise detection circuit is set low. Thus, when the field strength of the received signal is strong, the first output signal will be generated by the field strength detection circuit, whereby detection of the noise signal using the high sensitivity first noise detection circuit is possible, and the problem of insufficient sensitivity does not occur. Furthermore, when the field strength of the received signal is weak, the second output signal will be outputted from the field strength detection circuit, whereby the detection of the noise signal using the low sensitivity second noise detection circuit is possible, and improper operation does not occur.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

Figure 1:
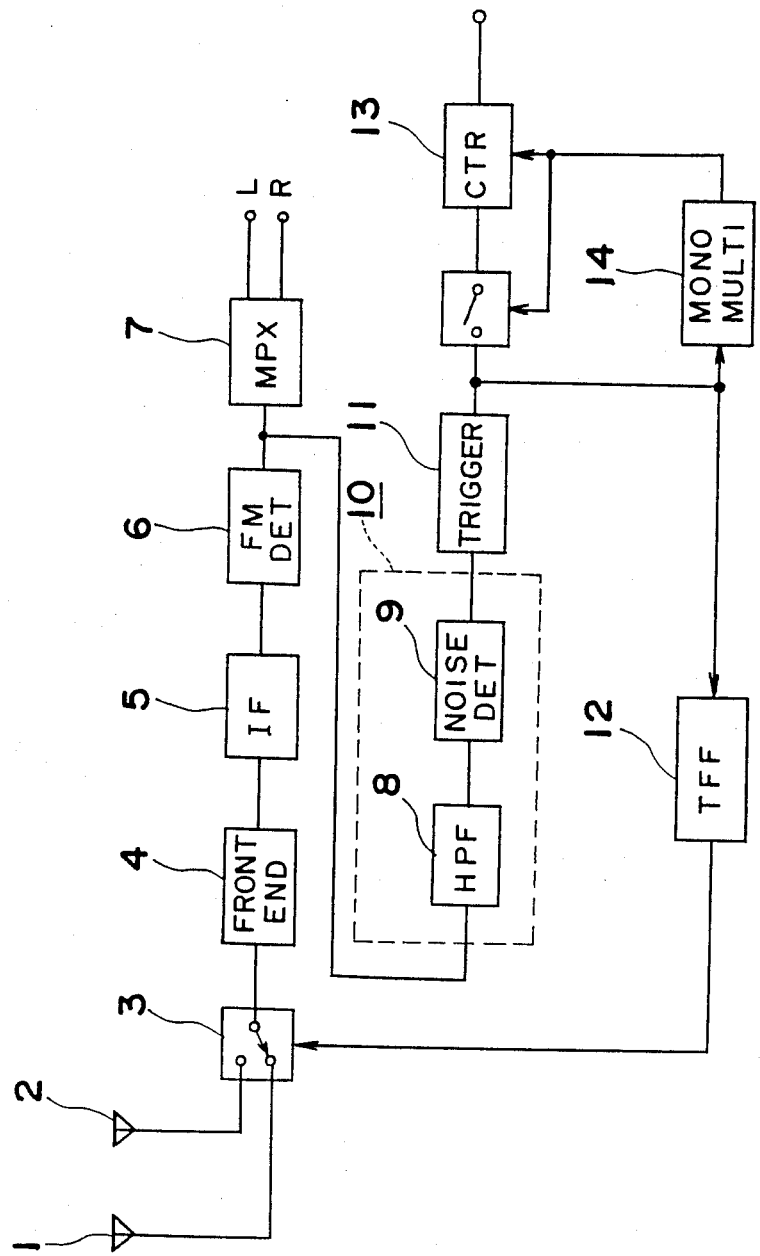
FIG. 1 is a circuit diagram showing a conventional diversity receiver.
Figure 2:
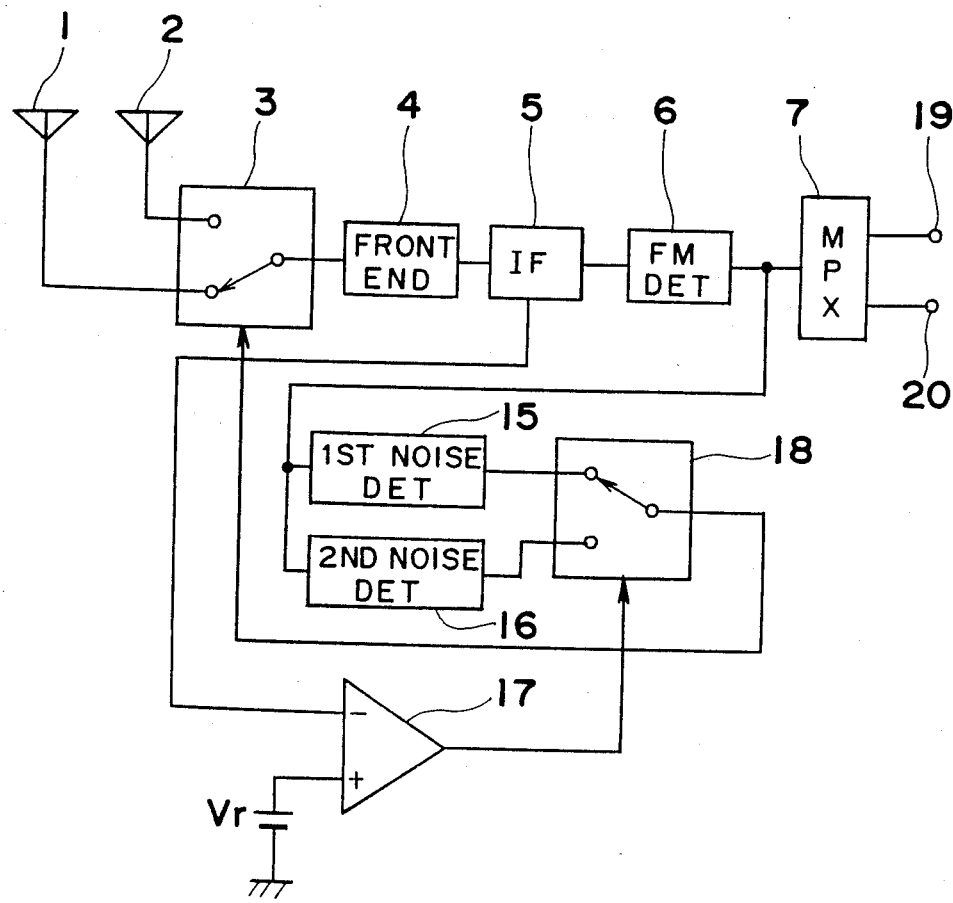
FIG. 2 is a circuit diagram of a diversity receiver according to a preferred embodiment of the present invention.

Referring to FIG. 2, a circuit diagram of a first embodiment according to the present invention is shown in which reference number 15 is first noise detection circuit with a high sensitivity, 16 is a second noise detection circuit with a low sensitivity, 17 is a field strength detection circuit which compares a signal expressing the field strength of the received signal obtained from IF amplifier 5 with a predetermined reference voltage Vr and produces a first or second output signal when the signal expressing the field strength is higher or lower, respectively, than the predetermined reference voltage Vr. Reference number 18 is a selector for selecting the output signal of either first or second noise detection circuit 15 or 16 according to the output signal of the field strength detection circuit 17, and thus controls antenna switching circuit 3.

In operation, if antenna switching circuit 3 and selector 18 are connected in a manner as shown in FIG. 2, the RF signal received at first antenna 1 is transmitted to the front end 4, so that the required signal processing is performed by IF amplifier 5, FM detector 6, and stereo multiplexer 7, and thus, left-right stereo signals are obtained at the first and second output terminals 19 and 20.

Furthermore, the high frequency noise signal contained in the output signal of FM detector 6 is applied to first and second noise detection circuits 15 and 16. Each of the first and second noise detection circuits 15 and 16 produces an output signal according to the high frequency noise signal, such as a multipass noise signal. In addition, the signal indicative of the field strength of the received signal as produced from IF amplifier 5 is applied to field strength detection circuit 17, which in turn produces either a first (e.g., low) level or a second (e.g., high) level output signal which is applied t selector 18.

When the field strength of the R signal received at the first antenna 1 is sufficiently high, the level of the signal transmitted from IF amplifier 5 to field strength detection circuit 17 is greater than the predetermined reference voltage Vr, and thus, a low level first output signal is produced from field strength detection circuit 17. In this state, selector 18 maintains the position as shown in FIG. 2, and thus the output signal of first noise detection circuit 15 is transmitted through selector 18 to antenna switching circuit 3.

If a multipass condition or any other noise generation condition does not arise, no noise detection signal is produced from first detection circuit 15. Thus, selector 18 provides no noise detection signal to antenna switching circuit 3, so that antenna switching circuit 3 is maintained in the state shown in FIG. 2, thereby continuing the normal reception using the first antenna 1.

If, for example, a multipass condition occurs in the RF signal received by antenna 1, the level of high frequency noise signal contained in the output signal of FM detector 6 becomes high. This high noise level is detected by the first noise detection circuit 15 which then produces a corresponding noise detection signal. The noise detection signal is transmitted from first noise detection circuit 15 through selector 18 to antenna switching circuit 3. Thus, antenna switching circuit 3 switches the connection of the antenna from antenna 1 to antenna 2, so that the front end 4 starts to receive the RF signal from antenna 2.

Thereafter, if a multipass condition occurs in the RF signal received by antenna 2, the first noise detection circuit 15 detects a high noise signal level in the signal produced from FM detector 6, so that first noise detection circuit 15 again produces a noise detection signal which is applied through selector 18 to antenna switching circuit 3. Thus, antenna switching circuit 3 switches the connection of the antenna from antenna 2 back to antenna 1.

Then, if the field strength of the received signal drops, the level of the signal transmitted from IF amplifier 5 to field strength detection circuit 17 becomes lower than the reference voltage Vr, and thus a high level second signal is produced from field strength detection circuit 17. Thus, selector 18 switches to the position which is the opposite of that shown in FIG. 2, so that the output of the second noise detection circuit 16 is selected.

As previously described, the detection sensitivity of the second noise detection circuit 16 is set lower than that of the first noise detection circuit 15. Thus, second noise detection circuit 16 does not respond to white noise and other aberrations caused by a weak field strength, and is therefore able to detect accurately only noise signal which is not dependent upon field strength, e.g., multipass noise signal. Therefore, noise signal contained in the output of FM detector 6 is detected by second noise detection circuit 16, and when a noise detection signal is produced from second noise detection circuit 16, it is applied to antenna switching circuit 3 through selector 18 so that the antenna switching circuit 3 switches the antenna between the position shown in FIG. 2 and the position opposite that shown in FIG. 2. Thus, RF signal reception by the antenna is switched from that using the first antenna 1 to that using the second antenna 2, or vice versa. If noise signal is again detected in this state, antenna switching will once again occur.

Therefore, if a diversity receiver such as shown in FIG. 2 is used, noise signals caused by multipasses can be accurately detected irrespective of the field strength of the received signal, and antenna switching can effectively occur.

Figure 3:
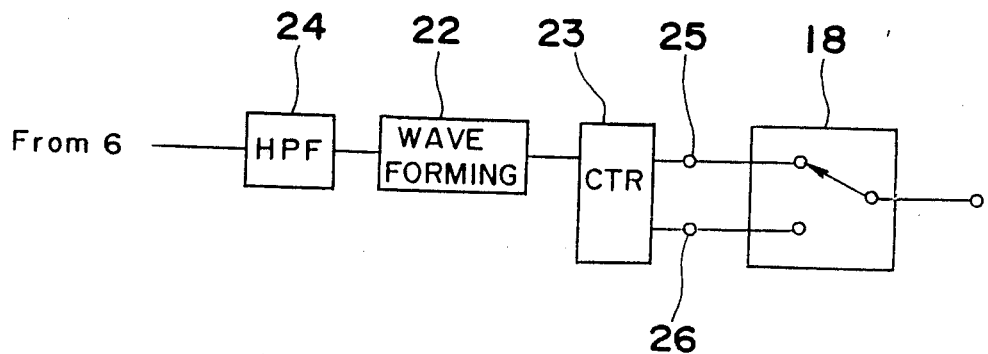
FIG. 3 is a circuit diagram showing an alternative embodiment of the, first and second noise detection circuits shown in FIG. 2.

Referring to FIG. 3, a circuit diagram of a modification of tn first and second noise detection circuits 15 and 16 is shown, in which a counter is used as the first and second noise detection circuits 15 and 16. In FIG. 3, the high frequency noise signal contained in the output of FM detector 6 is applied to a high pass filter 24 and in turn to a wave forming circuit 22. Wave forming circuit 22 produces a rectangular pulse corresponding to the noise signal exceeding a specified level. The rectangular pulse is then applied to the counter 23 for counting the number of rectangular pulses generated. When counter 23 counts, for example, three rectangular pulses, counter 23 produces a high level signal from its first output terminal 25, and when counter 23 counts, for example, ten pulses, counter 23 produces a high level signal from its second output terminal 26. Therefore, the noise detection circuit shown in FIG. 3 operates as a first noise detection circuit of high sensitivity when selector 18 is in a state as shown in FIG. 3, and operates as a second noise detection circuit of low sensitivity when the selector 18 is in a state opposite that shown in FIG. 3.

It is to be noted that if the circuit as shown in FIG. 3 is used, the circuitry can be simplified because a single counter can be shared, and the sensitivity setting can be changed by simply changing the count value.

Figure 4:
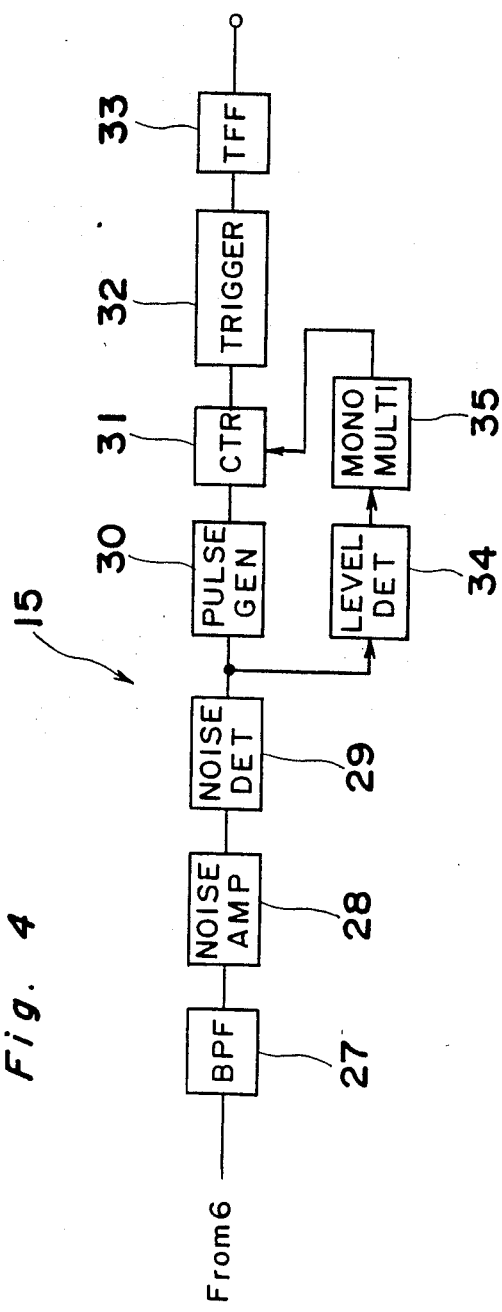
FIG. 4 is a circuit diagram showing a modification of the first noise detection circuit shown in FIG. 2.

Referring to FIG. 4, a circuit diagram of a modification of the first noise detection circuit 15 is shown, in which 27 is a bandpass filter for filtering and detecting the high frequency noise signal in the output signal from FM detector 6, 28 is a noise signal amplifier for amplifying the high frequency noise signal, 29 is a noise signal detector for detecting the output signal (representing tho noise) from noise amplifier 28, 30 is a pulse generator for generating a pulse when the noise detected output signal from noise signal detector 29 exceeds a predetermined threshold level, 31 is a counter, 32 is a trigger circuit which generates a trigger signal according to the output signal of counter 31, 33 is a T-FF (trigger flip-flop) which is triggered by the output signal of the trigger circuit 32, and 34 and 35 are a level detector and monostable multivibrator, respectively, which control the operation of the counter 31 such that counter 31 counts only during the high level signal produced from the multivibrator 35.

The circuit shown in FIG. 4 has a noise amplifier 28 between the bandpass filter 27 and noise signal detector 29 so that the high frequency noise signal passing the bandpass filter 27 can be amplified to a sufficient level and thus the noise detection of high sensitivity can be realized.

Figure 5:
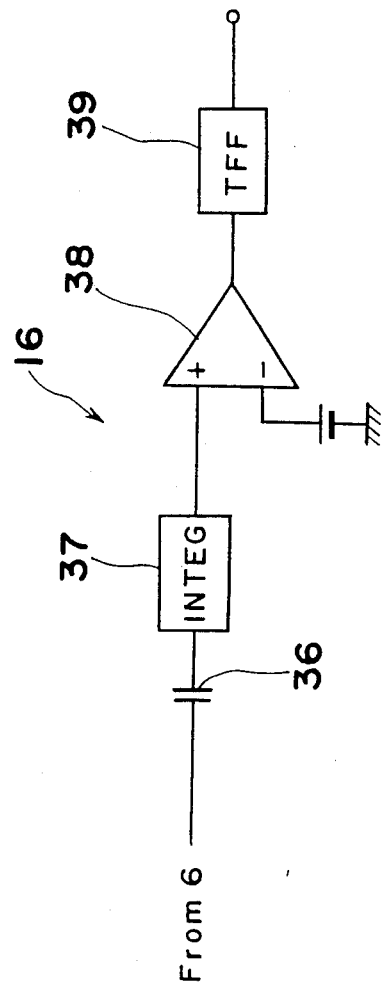
FIG. 5 is a circuit diagram showing a modification of the second noise detection circuit shown in FIG. 2.

Referring to FIG. 5, a circuit diagram of a modification of the second noise detection circuit 16 is shown which includes a capacitor 36 for cutting DC component and passing high frequency noise signal, an integrator 37, a comparator 38, and a T-FF 39. When the circuit shown in FIG. 5 is employed, the AC component, which is the noise signal, contained in the detected signal obtained from FM detector 6 is integrated with a long time constant and compared with a reference voltage. When the circuit of FIG. 5 is employed, white noise caused by a weak field strength will not be detected due to the low sensitivity. Thus, the noise signals caused by a multipass can be accurately detected.

Figure 6:
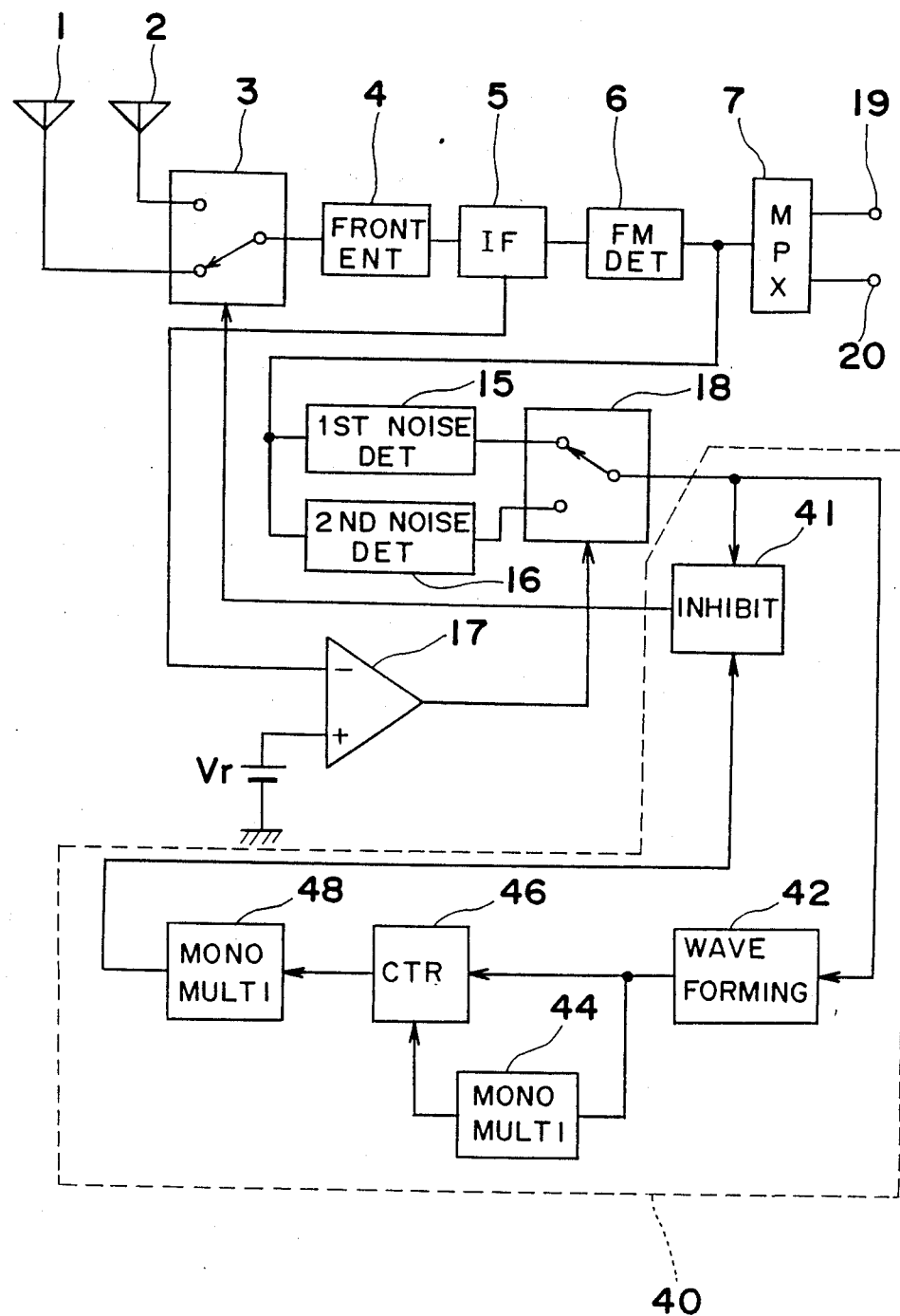
FIG. 6 is a circuit diagram showing a modification which further has a signal blocking circuit.

Referring to FIG. 6, another modification is shown in which a signal blocking circuit 40 is inserted between selector 18 and antenna switching circuit 3. Signal blocking circuit 40 includes a transmission inhibit circuit 41, a wave forming circuit 42 for waveforming the noise detection signal obtained from selector 18, a monostable multivibrator 44 for producing a pulse having a predetermined period of duration (such as 1 second) in response to the noise detection signal (a very narrow pulse signal), a counter 46 for counting the number of noise detection signals during a period in which monostable multivibrator 44 is producing a pulse and for producing a trigger pulse when counter has counted more than a predetermined number of noise detection signals, such as three noise detection signals, during the pulse duration, and a monostable multivibrator 48 for producing a pulse having a predetermined pulse duration in response to the trigger pulse from counter 46. During when the monostable multivibrator 48 is producing a pulse, transmission inhibit circuit 41 stops transmitting the output of selector 18 to antenna switching circuit 3.

By the circuit FIG. 6, when either one of the first and second noise detectors 15 and 16 produces through selector 18 a number of noise detection signals at a high frequency, such as three or more noise detection signals per second, signal blocking circuit 40 blocks the transmission so as to prevent the high frequency noise detection signals from being transmitted to antenna switching circuit 3. Accordingly, when the noise signal is captured by both antennae 1 and 2, frequent antenna switching by antenna switching circuit 3 can be prevented, and sounds irritating to the listener can be prevented.

Figure 7:
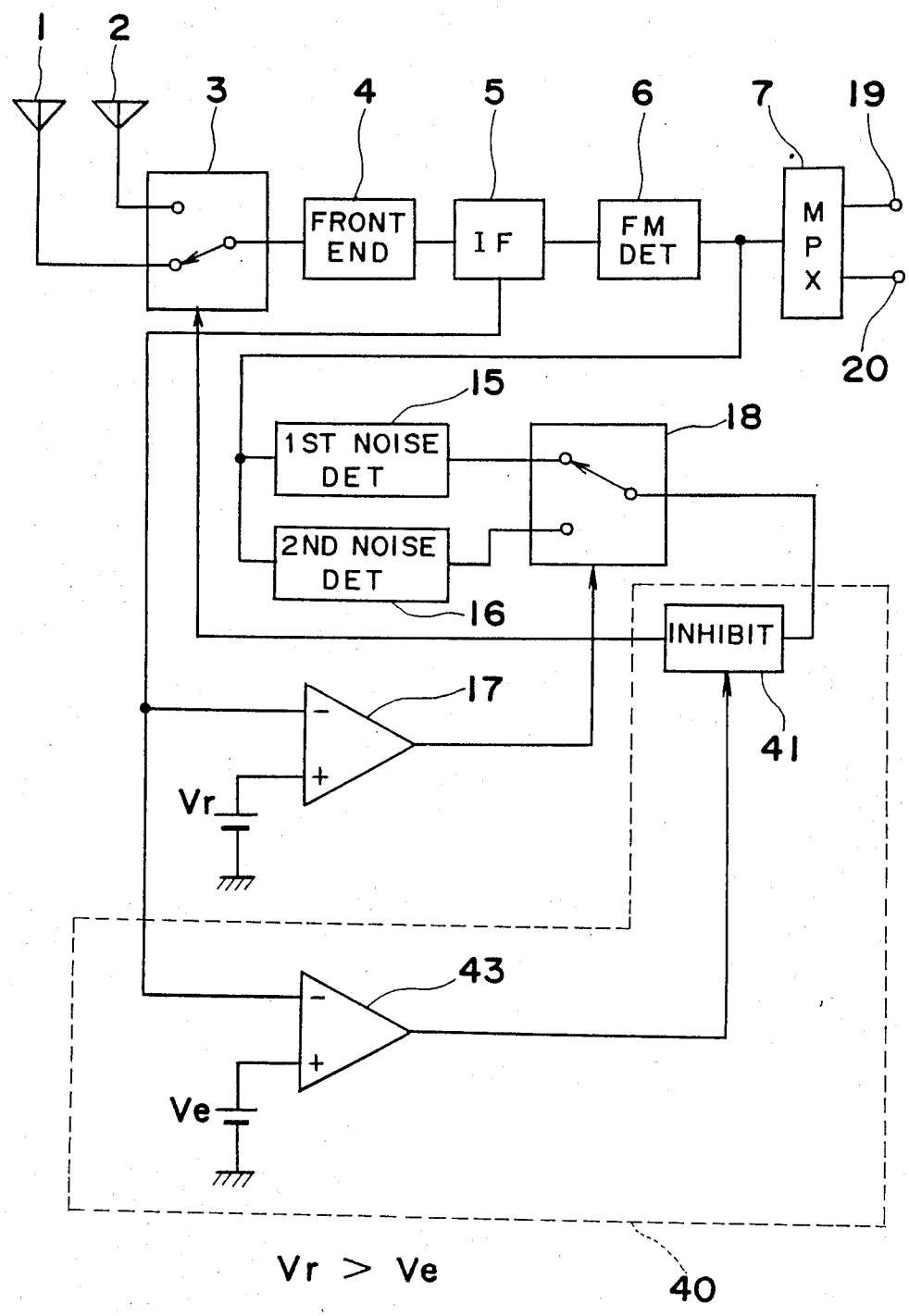
FIG. 7 is a circuit diagram similar to FIG. 6, but showing a modification thereof.

Referring to FIG. 7, a modification of the signal blocking circuit 40 is shown, which includes transmission inhibit circuit 41 and a field strength detector 43 which is defined by a comparator having its inverting input connected to the IF circuit 5 and non-inverting input connected to a predetermined reference voltage Ve which is smaller than the predetermined reference voltage Vr. The output of comparator 43 is connected to transmission inhibit circuit 41.

By the circuit of FIG. 7, when the field strength becomes very weak, which is weaker than that detected by the field strength detector 17, comparator 43 produces a high level signal which is applied to transmission inhibit circuit 41. Thus, when the field strength is very weak, the RF signal reception condition will hardly change even when the antennae 1 and 2 are switched. Thus, in such a case, the signal transmission from selector 18 to antenna switching circuit 3 is blocked to prevent the antenna switching operation between antennae 1 and 2. Thus, antenna switching when the field strength of the received signal is extremely low will not occur, and unnecessary antenna switching can be prevented before such may occur.

As will be understood from the above description, a diversity receiver according to the present invention uses two noise detection circuits with varying high an low sensitivity levels according to the field strength of the received signal, and therefore, correct antenna switching will be carried out.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A diversity receiver comprising:
   first and second antennas for receiving an RF signal;
   receiver means,
   an antenna switching circuit for selecting one of said first and second antennas for coupling to said receiver means,
   a first detection circuit, having a high sensitivity, for detecting a noise signal contained within the received RF signal;
   a second detection circuit, having a low sensitivity, for detecting a noise signal contained within the received RF signal;
   a field strength detection circuit for detecting the field strength of the received RF signal; and
   a selection circuit for selecting an output signal generated by either one of the first and second detection circuits according to the output signal of said field strength detection circuit, and for providing a switching signal to said antenna switching circuit for switching the selection of said antenna;
   whereby when the field strength of the received signal is relatively strong, said first detection circuit with high sensitivity is used for the noise detection, and when the field strength is relatively weak, said second detection circuit with low sensitivity is used for the noise detection.

2. A diversity receiver according to claim 1, wherein said selection circuit selects an output of said first detection circuit when the field strength of the received signal is greater than a predetermined level.

3. A diversity receiver according to claim 1, wherein said first detection circuit comprises a first counter for counting pulses corresponding to said noise signals and for producing a first output signal when the value of said first counter exceeds a first predetermined value, and wherein said second detection circuit comprises a second counter for counting pulses corresponding to said noise signals and for producing a second output signal when the value of said second counter exceeds a second predetermined value which is greater than said first predetermined value.

4. A diversity receiver according to claim 3 wherein said first and second counters comprise a common counter which produces a first output signal when the value of the common counter reaches a first predetermined value, and a second output signal when the value of the common counter reaches a second predetermined value which is greater than said first predetermined value.

5. A diversity receiver according to claim 1 wherein said first detection circuit comprises a counter for counting a number of noise pulses and for producing a noise signal upon counting a predetermined number of noise pulses.

6. A diversity receiver according to claim 1 wherein said second detection circuit comprises an integrator for integrating a noise signal, and a comparator for comparing the integrated signal with a predetermined level.

7. A diversity receiver according to claim 1 further comprising a signal blocking circuit between said selection circuit and said antenna switching circuit for blocking the transmission of said switching signal to said antenna switching circuit.

8. A diversity receiver according to claim 7, wherein said signal blocking circuit comprises an inhibit circuit between said selection circuit and said antenna switching circuit, a counter for counting the number of noise signals produced in a predetermined period of time, and a pulse generator for generating, when the value of said counter exceeds a second predetermined value, an inhibit pulse having a predetermined pulse width to said inhibit circuit, whereby said inhibit circuit stops the transmission of said switching signal to said antenna switching circuit during the presence of said inhibit pulse.

9. A diversity receiver according to claim 7, wherein said signal blocking circuit comprises an inhibit circuit between said selection circuit and said antenna switching circuit and a second field strength detection circuit for detecting the field strength of the received RF signal and for producing an inhibit signal when the field strength is lower than a predetermined field strength, whereby said inhibit circuit stops the transmission of said switching signal to said antenna switching circuit during the presence of said inhibit signal.

* * * * *